G. M. RICHARDS.
LOAD CONTROLLING DEVICE.
APPLICATION FILED SEPT. 23, 1912.

1,191,467.

Patented July 18, 1916.

UNITED STATES PATENT OFFICE.

GEORGE M. RICHARDS, OF ERIE, PENNSYLVANIA.

LOAD-CONTROLLING DEVICE.

1,191,467.     Specification of Letters Patent.     Patented July 18, 1916.

Application filed September 23, 1912. Serial No. 721,730.

*To all whom it may concern:*

Be it known that I, GEORGE M. RICHARDS, a citizen of the United States, residing at Erie, in the county of Erie and State of Pennsylvania, have invented a new and useful Improvement in Load-Controlling Devices, of which the following is a specification.

This invention relates to load controlling devices for use in connection with fluid compressors or pumps, whereby the machine can be started without load and then automatically loaded after the same reaches the desired speed, and whereby the compressor can be unloaded at any predetermined pressure of the pumped fluid.

The controlling device is primarily intended for use on compressors which are driven by electric motors or other motors having small starting torque, in which case it is desirable to start the machine without load, but the device is also adapted for use with gas engine driven and other types of compressors.

The objects of the invention are to provide an efficient and reliable load controlling device, of novel construction, which will automatically load the machine after the desired speed has been attained, and unload the machine when the pressure of the pumped fluid reaches the desired maximum, and which can be readily adjusted to operate under various different conditions; also to simplify the construction of devices of this kind and to render the same more sensitive to changes in the pressures of the pumped fluid; also to provide means for locking the parts of the device in any desired position to prevent the operation thereof; also to provide the device with a check valve of improved construction in which the noise usually caused by the operation of valves of this kind is eliminated; also to improve the construction of devices of this kind in the respects hereinafter specified.

Figure 1:
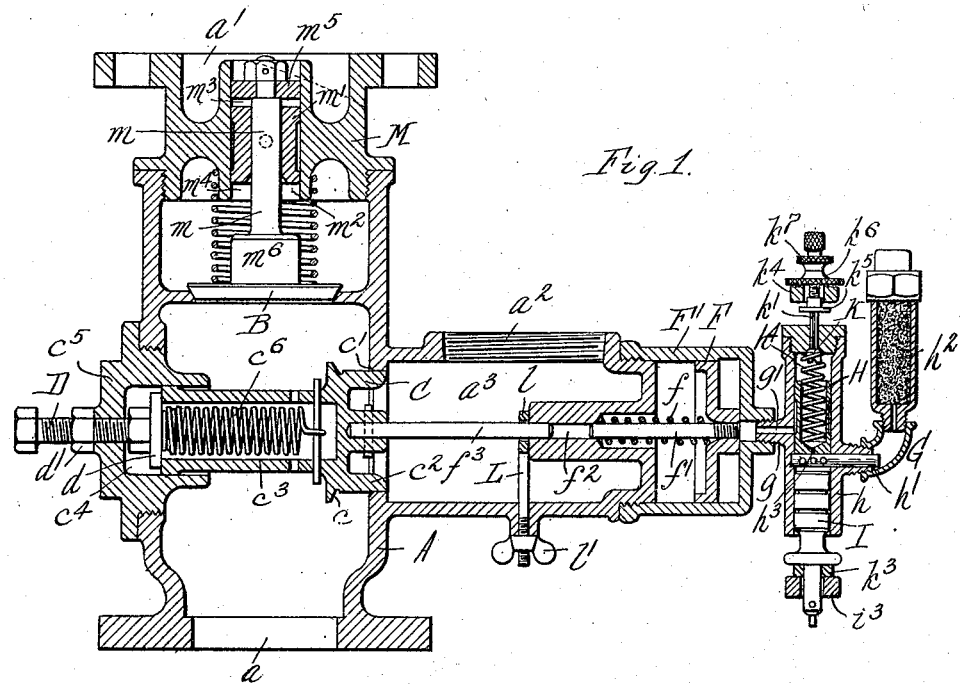
Figure 2:
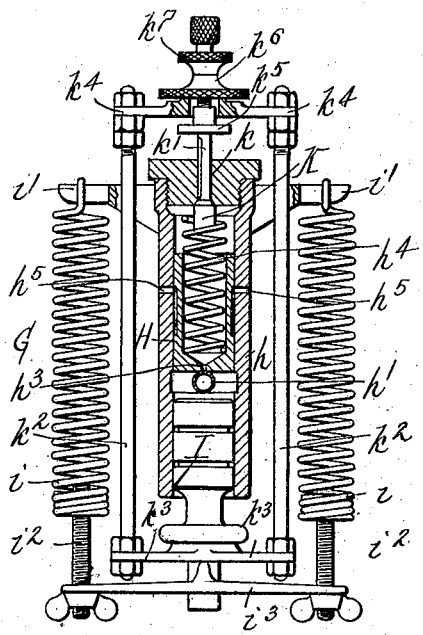

In the accompanying drawings: Figure 1 is a longitudinal sectional elevation of a load controlling device embodying the invention. Fig. 2 is a transverse sectional elevation thereof on line 2—2, Fig. 1.

Like reference characters refer to like parts in the several figures.

The load controller forming the subject of this invention is especially suited for use on air compressors, and the word "air" will be hereinafter used to designate the pumped fluid, but it is not intended thereby to limit the invention to air compressors.

A represents the casing of the load controlling device which may be of any suitable construction and which has an inlet opening $a$ through which the air from the compressor enters the casing, and an outlet opening $a'$ through which the air passes to the receiver or discharge pipes of the system. The casing is provided between its air inlet and outlet openings with a suitable escape or relief opening $a^2$ leading to the atmosphere. In the construction shown, this opening is provided in a lateral extension $a^3$ of the casing A. The outlet opening $a'$ is preferably controlled by a suitable check valve B, hereinafter more fully described, which serves to retain the pressure in the receiver or discharge pipes of the system.

The escape of air from the casing A is controlled by an unloading valve C which is located in the casing and is provided with a beveled face $c$ adapted to coöperate with a seat $c'$ surrounding the inner end of the escape extension $a^3$. This valve may be of any suitable construction, being preferably provided with guide ribs $c^2$ entering the escape extension for guiding the movements of the valve, and with a hollow stem $c^3$ which extends across the casing A with its extremity arranged to slide in a pocket $c^4$ in the casing to further guide the movements of the valve. The guide pocket $c^4$ is preferably formed in a screw cap $c^5$ which closes the opening through which the unloading valve is introduced into the casing. The valve is yieldingly held open or unseated by a suitable spring $c^6$ which is preferably located within the hollow stem $c^3$. When the compressor is started, the parts are in the position shown in Fig. 1 and the air from the compressor escapes from the casing A past the unloading valve C to the atmosphere, so that the compressor is unloaded. As the speed of the compressor increases, the volume of air discharged through the valve also increases and produces a pressure within the casing. When this pressure becomes great enough to overcome the spring $c^6$ the valve will be closed and the air is then discharged from the casing through the outlet opening $a'$ to the receiver or discharge pipes of the system, thereby loading the machine.

In order to enable the compressor to be loaded when the compressor attains any desired speed, means are provided for controlling the open position of the unloading valve C, so as to enlarge or restrict the valve opening. Any suitable means may be employed for this purpose, such for example, as a stop screw D passing through a threaded hole in the screw cap $c^5$ and provided at its inner end with a disk or washer $d$ which engages the hollow stem $c^3$ of the unloading valve. The valve spring $c^6$ is secured in any suitable way to the inner end of the stop screw and yieldingly draws the valve against the disk $d$. Thus by adjusting the stop screw, the opening movement of the valve can be regulated as desired. A lock nut $d'$ is preferably provided for securing the stop screw in its adjusted position.

In setting the load controlling device to load the machine at a certain speed, the machine is started, and when the desired speed is attained, the stop screw D is turned to throttle the valve C until the valve is closed by the pressure within the casing. The stop screw is then locked in this position by means of the lock nut $d'$. The compressor will then always be loaded at the same speed when starting, unless the position of the stop screw is changed. The unloading device is also provided with means actuated by the air pressure in the receiver or discharge pipes to unseat the valve for unloading the compressor when the air in the receiver or discharge pipes of the system attains a certain pressure. In the construction shown for this purpose, a piston F and a cylinder F' are provided, the cylinder being secured to the escape extension of the casing A. The piston F is normally held in its outer position, shown in Fig. 1, by a spring $f$ and has a rod or extension $f'$ which enters a tubular guide $f^2$ of the escape extension of the casing A and is adapted to engage a rod or extension $f^3$ of the unloading valve C. Air under pressure from the receiver or pipe system is admitted to the outer end of the cylinder to move the piston against the action of the spring $f$ to unseat the unloading valve C.

The admission of air to the cylinder F' for actuating the piston F is regulated by a controlling device G, which is secured to the cylinder F', for example, by a screw threaded connection $g$ having a passage $g'$ through which the air enters the cylinder F'. The controlling device comprises a cylinder $h$, in the opposite ends of which are arranged movable pistons H and I. Air from the receiver is admitted to the casing between the pistons H and I through an inlet pipe $h'$, being preferably first passed through a suitable filter $h^2$. The pressure of the air in the cylinder $h$ tends to move the pistons outwardly or away from each other and in order to equalize the pressure acting on the two sides of the piston H, a small hole or opening $h^3$ is preferably provided in the piston H to permit the air from below the piston to enter the casing above the piston. Any other means may, however, be used to admit the pressure to the cylinder on the two sides of the piston H. When the pressure is thus equalized, the piston H is moved to its inner or lower position against the inlet pipe $h'$ by a suitable spring $h^4$ arranged between the upper end of the casing and the piston. The piston H is adapted to connect the cylinder F' either with the compressed air from the receiver or with the atmosphere, for which purpose the piston shown is provided with an annular groove which, when the piston is in its lower position, connects the inlet passage $g'$ of the cylinder F' with holes or openings $h^5$, Fig. 2, leading to the atmosphere. When the piston is in its upper position the lower end thereof clears the passage $g'$ and permits the air from the casing $h$ to enter into the cylinder F'.

The piston I extends out of the end of the cylinder $h$ and its outward movement by the pressure of the air is opposed by an adjustable resistance device, consisting, for instance, of springs $i$ $i$ connected at one end thereof to arms $i'$ on the cylinder $h$, and at the other end by tensioning screws $i^2$ to the ends of a yoke $i^3$, bearing on the outer end of the piston I. By adjusting the screws $i^2$, the tension of the springs can be varied to cause the piston I to be moved by the air at one or another desired pressure. Any other suitable means for resisting the movement of the piston I may be employed.

K represents a relief valve which controls a hole $k$ in the upper end of the cylinder $h$ through which the pressure above the piston H can be relieved to permit the upward movement of the piston by opening the relief valve K. The relief valve shown is provided with a stem $k'$ which projects through the relief hole and is grooved, or otherwise shaped, to allow the escape of air through the hole when the valve is unseated. This valve is operated by the lower piston I through suitable connections, such, for instance, as rods $k^2$ connecting lateral arms $k^3$ on the outer end of the piston I with a yoke $k^4$ attached to the relief valve K. The outer end of the stem of the relief valve, which is screw threaded, passes loosely through a hole in the yoke $k^4$ and is provided above and below the yoke with adjustable nuts $k^5$ $k^6$, adapted to be engaged by a yoke for opening and closing the valve. $k^7$ is a lock nut for the adjustable nut $k^6$. A lost motion connection is thus provided between the piston I and the relief valve, which allows the piston to be moved more or less, depending upon the adjustment of the nuts $k^5$ $k^6$, before operating the relief valve. Any other suitable lost motion or adjustable connection between the piston I and the relief valve could be used. When the relief valve is seated, as shown in the drawings, the air cannot escape from the upper end of the cylinder $h$, and the pressure then being equal on opposite sides of the piston H, the latter will be held in the lower position shown, by its spring and will connect the cylinder F' with the atmosphere. The groove in the stem $k'$ of the relief valve is of such size that when the relief valve K is unseated, owing to an increase of pressure acting on the piston I, air will escape from the upper end of the controller cylinder faster than it can enter through the opening $h^3$ in the piston H. The pressure acting on the upper face of the piston H will consequently be diminished and the pressure acting on the lower face of the piston will move the piston against the action of the spring $h'$ to its upper position, thereby permitting air under pressure to enter the cylinder F' and move the piston F to unseat the unloading valve C. When the relief valve K is again seated, owing to the reduction of pressure acting on the piston I, the escape of air from the upper part of the casing is prevented and the pressure on opposite sides of the piston H being equalized, by the air admitted through the hole $h^3$, the spring $h^4$ will return the piston H to its lower position.

Means are preferably provided for locking the unloading valve C in any desired position to prevent the automatic operation of the unloader. The device shown for this purpose consists of a bolt L having an eye or loop $l$ surrounding the rod $f^3$ of the unloading valve. The threaded end of this bolt projects through a hole in the escape extension of the casing A and is provided with a thumb nut $l'$. When the nut is tightened the bolt will bind the rod $f^3$ of the valve against its tubular guide $f^2$, thus locking it against movement. By these means the unloader valve C can be locked in any desired position.

In order to cause the check valve B to operate without the noise usually attending the action of check valves, it is preferably constructed as follows:—The valve B has a stem $m$ which extends through a bushing $m'$ secured in a cylindrical hole $m^2$ in a check valve casing M, which is suitably secured to the casing A of the load controlling device. The bushing $m'$ forms a guide or bearing for the valve stem $m$ and also divides the hole $m^2$ into two cylinders $m^3$ and $m^4$. The valve stem is provided near its end with a disk $m^5$ which is adapted to enter the cylinder $m^3$ when the valve is near its seat and forms therewith a dash pot to prevent the valve from pounding against its seat. The valve stem has an enlarged part $m^6$, adjacent to the valve, which is adapted to enter the cylinder $m^4$ when the valve is near the upper end of its movement, and which forms with this cylinder a dash pot which resists the upward movement of the valve after the disk $m^5$ has been raised out of the cylinder $m^3$, the air cushion in the cylinder $m^4$ forming a better check against the upward movement of the valve than the partial vacuum formed in the cylinder $m^3$. By means of this construction any sudden movements of the valve, as well as the pounding of the valve, either against its seat or against the check valve casing, are prevented.

The load controlling device described is reliable in operation and can be readily adjusted to operate under different conditions. The device can be easily locked, so as to render the same inoperative, and does not resist the flow of air from the compressor or decrease the efficiency of the machine.

I claim as my invention:

1. In a load controlling device for fluid compressors, the combination of a casing having inlet and outlet openings which connect, respectively, with the compressor and a receiver for the compressed fluid and an escape opening between said inlet and outlet openings, a valve controlling said escape opening which is yieldingly held in its open position when the compressor is starting to permit the air from the compressor to discharge to the atmosphere, and which is adapted to be closed automatically by the direct pressure thereon of the pumped fluid within the casing to cause the fluid to pass to said receiver, and means for unseating said valve when the fluid in the receiver reaches a certain predetermined pressure, substantially as set forth.

2. In a load controlling device for fluid compressors, the combination of a casing having inlet and outlet openings which connect, respectively, with the compressor and a receiver for the compressed fluid and an escape opening between said inlet and outlet openings, a valve controlling said escape opening which is yieldingly held in its open position when the compressor is starting to permit the air from the compressor to discharge to the atmosphere, and which is adapted to be closed automatically by the direct pressure thereon of the pumped fluid within the casing to cause the fluid to pass to said receiver, and means controlled by the pressure of the pumped fluid for unseating said valve when the fluid in the receiver reaches a certain predetermined pressure, substantially as set forth.

3. In a load controlling device for fluid compressors, the combination of a casing having inlet and outlet openings which connect respectively, with the compressor and a receiver for the compressed fluid and an escape opening between said inlet and outlet openings, a valve controlling said escape opening which is yieldingly held in its open position when the compressor is starting to permit the air from the compressor to discharge to the atmosphere, and which is adapted to be closed automatically by the direct pressure thereon of the pumped fluid within the casing to cause the fluid to pass to said receiver, a piston operatively connected with said valve, a cylinder in which said piston works, and a controlling device operated by the pressure in said receiver for admitting compressed fluid to said cylinder for causing said piston to unseat said valve, substantially as set forth.

4. In a load controlling device for fluid compressors, the combination of a casing having inlet and outlet openings and an escape opening between said inlet and outlet openings, a valve controlling said escape opening which is yieldingly held in its open position and is adapted to be closed by the pressure thereon of the fluid in the casing, a piston located in a cylinder for operating said valve and which is adapted to be actuated by the compressed fluid, and connections between said piston and said valve for unseating the valve by the movement of the piston in one direction, substantially as set forth.

5. In a load controlling device for fluid compressors, the combination of a casing having inlet and outlet openings and an escape opening between said inlet and outlet openings, a valve controlling said escape opening and having a hollow stem which extends across said casing, means on one side of said casing for guiding said valve, means on the opposite side of said casing for guiding said hollow stem, and a spring arranged in said hollow stem for yieldingly holding the valve in its open position, said valve being adapted to be closed by the direct pressure thereon of the fluid in the casing, substantially as set forth.

6. In a load controlling device for fluid compressors, the combination of a casing having an inlet opening and an outlet opening which is connected with a receiver for the compressed fluid, and an escape opening between said inlet and outlet openings, a valve controlling said escape opening and having a hollow stem, a spring arranged in said hollow stem for yieldingly holding the valve in its open position, said valve being closed by the pressure within said casing, an escape extension on said casing adjacent to said escape opening, a cylinder in said extension, and a piston in said cylinder which is actuated by the compressed fluid in the receiver when the pressure in the receiver reaches a certain predetermined value for opening said valve, substantially as set forth.

7. In a load controlling device for fluid compressors, the combination of a casing having inlet and outlet openings and an escape opening between said inlet and outlet openings, a valve controlling said escape opening and having a hollow stem which extends across said casing, means on one side of said casing for guiding said valve, means on the opposite side of said casing for guiding said hollow stem, a spring arranged in said hollow stem for yieldingly holding the valve in its open position, said valve being adapted to be closed by the direct pressure thereon of the fluid in the casing, and means for adjusting the tension of said spring when the valve is in its closed position, whereby the compressor is loaded at different speeds, substantially as set forth.

8. In a load controlling device for fluid compressors, the combination of a casing having inlet and outlet openings which connect, respectively, with the compressor and a receiver for the compressed fluid and an escape opening between said inlet and outlet openings, a valve controlling said escape opening which is yieldingly held in its open position when the compressor is starting to permit the air from the compressor to discharge to the atmosphere, and which is adapted to be closed by the pressure of the pumped fluid within the casing to cause the fluid to pass to said receiver, said valve having a hollow stem which extends across said casing, means on the casing for guiding the end of said stem, a spring arranged in said hollow stem for opening said valve, and means on said casing which are adjustable toward and from said valve and with which the valve engages when in its open position for limiting the opening movement of the valve relatively to the escape opening, whereby the compressor can be loaded at different desired speeds, substantially as set forth.

9. In a load controlling device for fluid compressors, the combination of a casing having inlet and outlet openings which connect respectively with the compressor and a receiver for the compressed fluid and an escape opening between said inlet and outlet openings, a valve controlling said escape opening which is yieldingly held in its open position when the compressor is starting to permit the air from the compressor to discharge to the atmosphere and which is adapted to be closed by the pressure of the pumped fluid within the casing to cause the fluid to pass to said receiver, and a screw extending through said casing and adapted to engage the valve when the same is in its open position, said screw being adjustable relatively to said valve to control the extent to which the valve is opened, whereby the compressor is loaded at different speeds, substantially as set forth.

10. In a load controlling device for fluid compressors, the combination of a casing having inlet and outlet openings which connect, respectively, with the compressor and a receiver for the compressed fluid and an escape opening between said inlet and outlet openings, an escape opening in said casing, a valve controlling said escape opening and having a stem, and a bolt secured in the casing which is adapted to engage said valve stem to frictionally hold the same in any position, substantially as set forth.

11. In a load controlling device for fluid compressors, the combination of a casing having inlet and outlet openings which connect respectively with the compressor and a receiver for the compressed fluid and an escape opening between said inlet and outlet openings, an escape opening in said casing, a valve controlling said escape opening and having a stem, and a bolt secured in the casing and having a part which surrounds said valve stem and which is adapted to be drawn into frictional engagement with said valve stem to lock the valve against movement at any position of the valve, substantially as set forth.

Witness my hand this 20th day of September, 1912.

GEORGE M. RICHARDS.

Witnesses:
E. G. JOHNSON,
C. A. MASTEN.

Copies of this patent may be obtained for five cents each, by addressing the "Commissioner of Patents, Washington, D. C."